US010205565B2

(12) United States Patent
Yang

(10) Patent No.: US 10,205,565 B2
(45) Date of Patent: Feb. 12, 2019

(54) METHOD FOR TRANSMITTING SIGNAL IN WIRELESS COMMUNICATION SYSTEM AND DEVICE THEREFOR

(71) Applicant: LG ELECTRONICS INC., Seoul (KR)

(72) Inventor: Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 308 days.

(21) Appl. No.: 15/126,576

(22) PCT Filed: Apr. 28, 2015

(86) PCT No.: PCT/KR2015/004259
§ 371 (c)(1),
(2) Date: Sep. 15, 2016

(87) PCT Pub. No.: WO2015/167222
PCT Pub. Date: Nov. 5, 2015

(65) Prior Publication Data
US 2017/0085344 A1 Mar. 23, 2017

Related U.S. Application Data

(60) Provisional application No. 61/985,416, filed on Apr. 28, 2014.

(51) Int. Cl.
*H04L 1/18* (2006.01)
*H04L 5/00* (2006.01)
(Continued)

(52) U.S. Cl.
CPC .......... *H04L 1/1896* (2013.01); *H04L 5/0055* (2013.01); *H04L 5/14* (2013.01); *H04L 5/1469* (2013.01); *H04W 72/0446* (2013.01)

(58) Field of Classification Search
CPC .................................................... H04L 1/1896
See application file for complete search history.

(56) References Cited

U.S. PATENT DOCUMENTS

2012/0327821 A1 12/2012 Lin et al.
2014/0022960 A1 1/2014 Fu et al.
(Continued)

FOREIGN PATENT DOCUMENTS

WO 2013105837 7/2013

OTHER PUBLICATIONS

Nokia, "Discussion on deployment scenarios for dynamic TDD UL-DL reconfigurations," 3GPP TSG-RAN WG1 #72, R1-130486, Jan. 2013, 4 pages.
(Continued)

*Primary Examiner* — John D Blanton
(74) *Attorney, Agent, or Firm* — Lee, Hong, Degerman, Kang & Waimey

(57) ABSTRACT

The present invention relates to a wireless communication system. Particularly, the present invention relates to a method for transmitting control information and a device therefor, the method comprising the steps of: configuring a first TDD cell having a first subframe pattern; configuring a second TDD cell having a second subframe pattern, wherein a direction for transmitting according to the first subframe pattern and a direction for transmitting according to the second subframe pattern differ from each other in each subframe; receiving a PDSCH in a DL subframe #n of the first TDD cell; and transmitting HARQ-ACK information for the PDSCH in a UL subframe #n−k of the second TDD cell, wherein n is an integer greater than or equal to zero, and k is a positive integer fixed regardless of the first subframe pattern and the second subframe pattern.

10 Claims, 10 Drawing Sheets

(51) Int. Cl.
*H04L 5/14* (2006.01)
*H04W 72/04* (2009.01)

(56) References Cited

U.S. PATENT DOCUMENTS

| | | |
|---|---|---|
| 2014/0064159 A1 | 3/2014 | Larsson et al. |
| 2015/0249985 A1* | 9/2015 | Han ................ H04W 72/0446 370/280 |
| 2015/0373550 A1* | 12/2015 | Hong ............... H04W 72/0446 370/254 |

OTHER PUBLICATIONS

PCT International Application No. PCT/KR2015/004259, Written Opinion of the International Searching Authority dated Aug. 17, 2015, 15 pages.

\* cited by examiner

PDSCH-ACK/NACK timing (UL-DL configuration #1)

* UL/DL SF pattern of first subframe pattern and UL/DL SF pattern of second subframe pattern are symmetrically configured. DL SF includes S SF

METHOD FOR TRANSMITTING SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2015/004259, filed on Apr. 28, 2015, which claims the benefit of U.S. Provisional Application No. 61/985,416, filed on Apr. 28, 2014, the contents of which are all hereby incorporated by reference herein in their entirety.

TECHNICAL FIELD

The present invention relates to a wireless communication system, and more particularly, to a method of transmitting and receiving a signal in a TDD (time division duplex) system and an apparatus therefor.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as code division multiple access (CDMA), frequency division multiple access (FDMA), time division multiple access (TDMA), orthogonal frequency division multiple access (OFDMA), or single carrier frequency division multiple access (SC-FDMA).

DISCLOSURE OF THE INVENTION

Technical Problem

One object of the present invention is to provide a method of efficiently transmitting and receiving a signal in a wireless communication system and an apparatus therefor. Another object of the present invention is to provide a method of efficiently transmitting and receiving a signal in a TDD system and an apparatus therefor.

The technical problems solved by the present invention are not limited to the above technical problems and those skilled in the art may understand other technical problems from the following description.

Technical Solution

To achieve these and other advantages and in accordance with the purpose of the present invention, as embodied and broadly described, according to one embodiment, a method of transmitting control information, which is transmitted by a user equipment in a wireless communication system, includes the steps of configuring a first TDD (time division duplex) cell including a first subframe pattern, configuring a second TDD cell including a second subframe pattern, wherein a transmission direction according to the first subframe pattern and a transmission direction according to the second subframe pattern are different from each other in every subframe, receiving PDSCH (physical downlink shared channel) in a DL subframe #n of the first TDD cell, and transmitting HARQ-ACK (hybrid automatic repeat request acknowledgement) information on the PDSCH in a UL subframe #n+k of the second TDD cell. In this case, the n may correspond to an integer equal to or greater than 0 and the k may correspond to a positive integer which is fixed irrespective of the first subframe pattern and the second subframe pattern.

To further achieve these and other advantages and in accordance with the purpose of the present invention, according to a different embodiment, a user equipment configured to transmit control information in a wireless communication system includes an RF (radiofrequency) unit and a processor, the processor configured to set a first TDD (time division duplex) cell including a first subframe pattern, the processor configured to set a second TDD cell including a second subframe pattern, wherein a transmission direction according to the first subframe pattern and a transmission direction according to the second subframe pattern are different from each other in every subframe, the processor configured to receive PDSCH (physical downlink shared channel) in a DL subframe #n of the first TDD cell, the processor configured to transmit HARQ-ACK (hybrid automatic repeat request acknowledgement) information on the PDSCH in a UL subframe #n+k of the second TDD cell. In this case, the n may correspond to an integer equal to or greater than 0 and the k may correspond to a positive integer which is fixed irrespective of the first subframe pattern and the second subframe pattern.

Preferably, at least a part of the transmission direction according to the first subframe pattern and at least a part of the transmission direction according to the second subframe pattern may be opposite to each other in every subframe.

Preferably, a DL (downlink)/UL (uplink) SF (subframe) pattern according to the first subframe pattern and a DL/UL SF pattern according to the second subframe patter may be symmetrical to each other and a DL SF can include an S (special) SF.

Preferably, the first subframe pattern is defined by original-cfg #i, the second subframe pattern is defined by reverse-cfg #i, and the i may correspond to an integer selected from among 0 to 6.

|  | SF number | | | | | | | | | |
| --- | --- | --- | --- | --- | --- | --- | --- | --- | --- | --- |
|  | 0 | 1 | 2 | 3 | 4 | 5 | 6 | 7 | 8 | 9 |
| Original-cfg #0 | D | S | U | U | U | D | S | U | U | U |
| Reversed-cfg #0 | U | U | D | D | S | U | U | D | D | S |
| Original-cfg #1 | D | S | U | U | D | D | S | U | U | D |
| Reversed-cfg #1 | U | U | D | S | U | U | U | D | S | U |
| Original-cfg #2 | D | S | U | D | D | D | S | U | D | D |
| Reversed-cfg #2 | U | U | S | U | U | U | U | S | U | U |
| Original-cfg #3 | D | S | U | U | U | D | D | D | D | D |
| Reversed-cfg #3 | U | U | D | D | S | U | U | U | U | U |
| Original-cfg #4 | D | S | U | U | D | D | D | D | D | D |
| Reversed-cfg #4 | U | U | D | S | U | U | U | U | U | U |
| Original-cfg #5 | D | S | U | D | D | D | D | D | D | D |
| Reversed-cfg #5 | U | U | S | U | U | U | U | U | U | U |
| Original-cfg #6 | D | S | U | U | U | D | S | U | U | D |
| Reversed-cfg #6 | U | U | D | D | S | U | U | D | S | U |

In this case, D, U and S may correspond to a DL SF, a UL SF and an S SF, respectively.

Preferably, the k can be fixed irrespective of the first subframe pattern and the second subframe pattern.

Advantageous Effects

According to the present invention, it is able to efficiently transmit and receive a signal in a wireless communication system. And, it is able to efficiently transmit and receive a signal in a multi-carrier system supporting TDD. And, it is able to reuse legacy signal transmission and reception timing when signal transmission and reception timing is configured in a multi-carrier system supporting TDD.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Mode for Invention

Embodiments of the present invention are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) evolves from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

Figure 1:
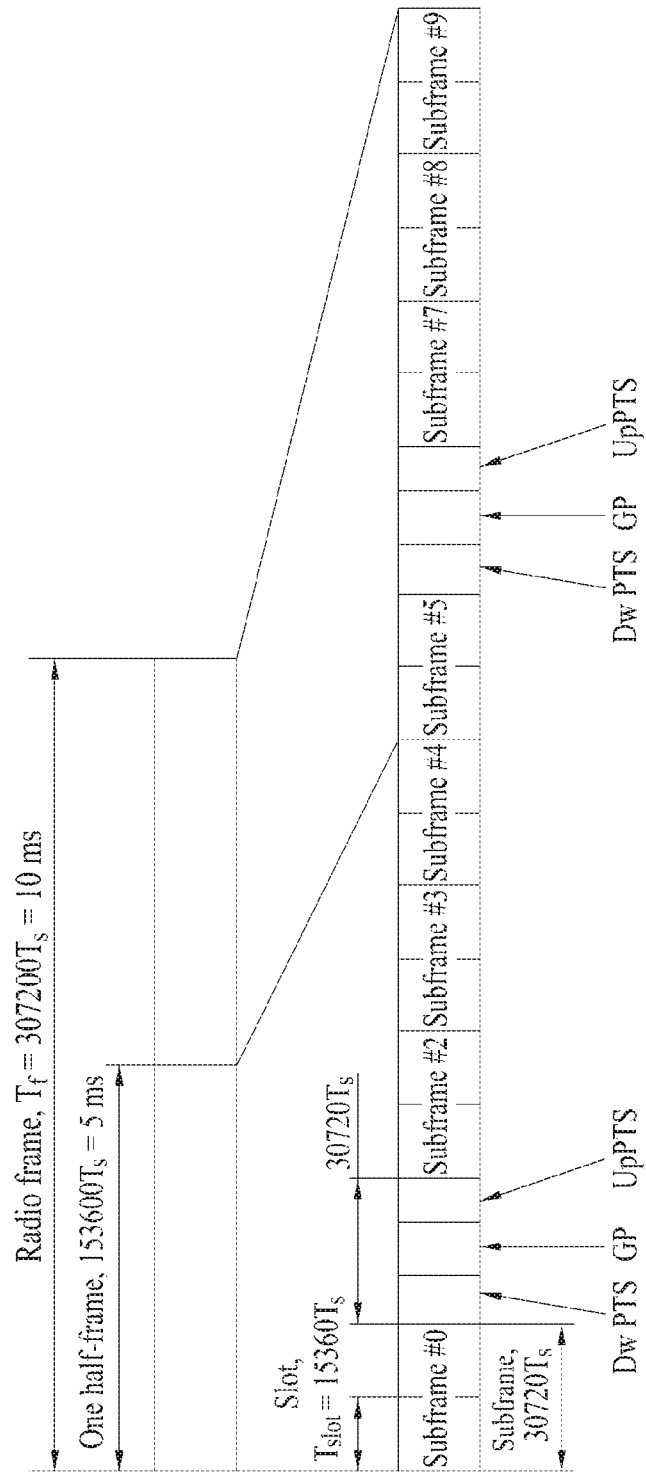
FIG. 1 illustrates a radio frame structure.

FIG. 1 illustrates a radio frame structure.

Referring to FIG. 1, a radio frame used in 3GPP LTE(-A) has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD (Frequency Division Duplex) mode, and thus the radio frame includes only one of a downlink subframe and an uplink subframe in a specific frequency band.

Particularly, FIG. 1 shows a radio frame structure for TDD, used in 3GPP LTE(-A). Table 1 shows UL-DL configurations (UD-cfgs) of subframes in a radio frame in the TDD mode.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 2:
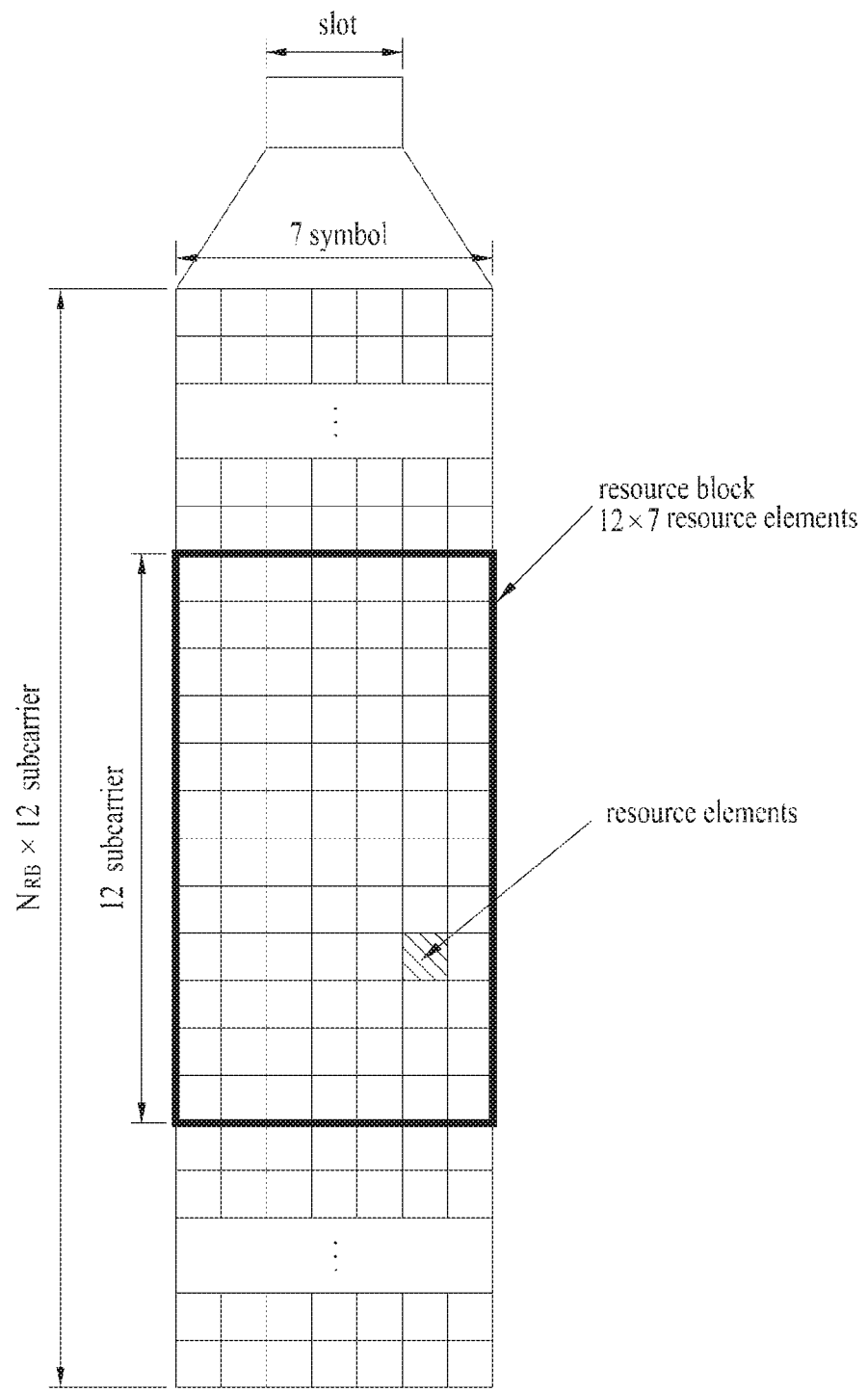
FIG. 2 illustrates a resource grid of a downlink slot.

FIG. 2 illustrates a resource grid of a downlink slot.

Referring to FIG. 2, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 3:
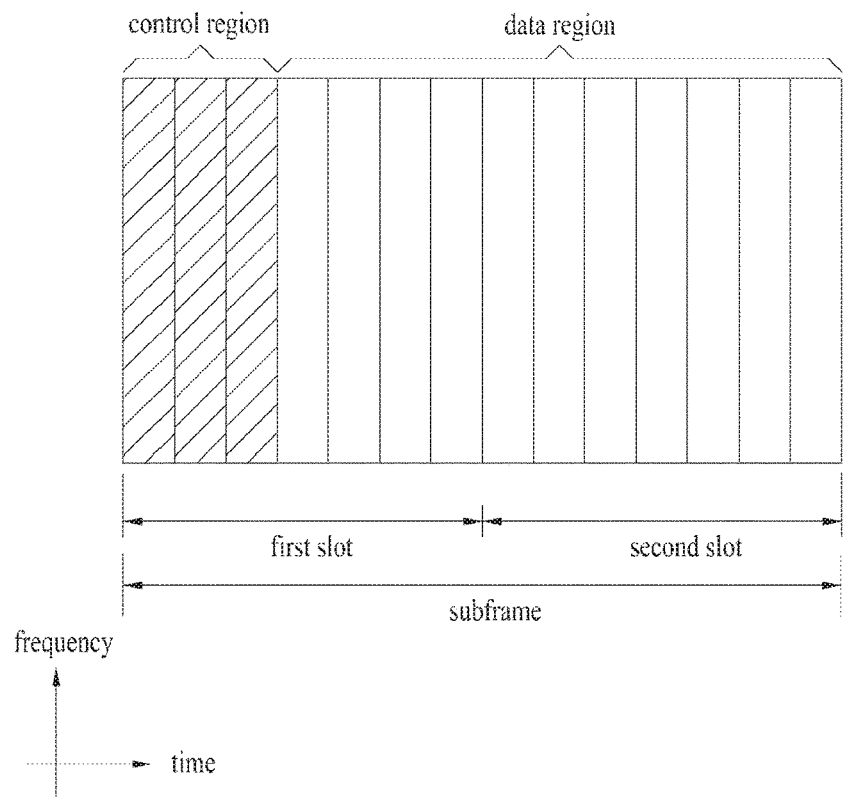
FIG. 3 illustrates a downlink subframe structure.

FIG. 3 illustrates a downlink subframe structure.

Referring to FIG. 3, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. A PDSCH is used to carry a transport block (TB) or a codeword (CW) corresponding to the TB. The TB means a data block transmitted from a MAC layer to a PHY layer through a transport channel. The codeword corresponds to a coded version of a TB. The corresponding relationship between the TB and the CW depends on swiping. In the specifically, the PDSCH, TB and CW are interchangeably used. Examples of downlink control channels used in LTE(-A) include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/not-acknowledgment (NACK) signal. A HARQ-ACK response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Control information transmitted through the PDCCH is referred to as downlink control information (DCI). The DCI includes resource allocation information for a UE or a UE group and other control information. For example, the DCI includes uplink/downlink scheduling information, an uplink transmit (Tx) power control command, etc. Transmission modes and information content of DCI formats for configuring a multi-antenna technology are as follows.

Transmission Mode
Transmission mode 1: Transmission from a single base station antenna port
Transmission mode 2: Transmit diversity
Transmission mode 3: Open-loop spatial multiplexing
Transmission mode 4: Closed-loop spatial multiplexing
Transmission mode 5: Multi-user MIMO
Transmission mode 6: Closed-loop rank-1 precoding
Transmission mode 7: Transmission using UE-specific reference signals
DCI Format
Format 0: Resource grants for the PUSCH transmissions (uplink)
Format 1: Resource assignments for single codeword PDSCH transmissions (transmission modes 1, 2 and 7)
Format 1A: Compact signaling of resource assignments for single codeword PDSCH (all modes)
Format 1B: Compact resource assignments for PDSCH using rank-1 closed loop precoding (mod 6)
Format 1C: Very compact resource assignments for PDSCH (e.g. paging/broadcast system information)
Format 1D: Compact resource assignments for PDSCH using multi-user MIMO (mode 5)
Format 2: Resource assignments for PDSCH for closed-loop MIMO operation (mode 4)
Format 2A: Resource assignments for PDSCH for open-loop MIMO operation (mode 3)
Format 3/3A: Power control commands for PUCCH and PUSCH with 2-bit/1-bit power adjustments As described above, the PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 4:
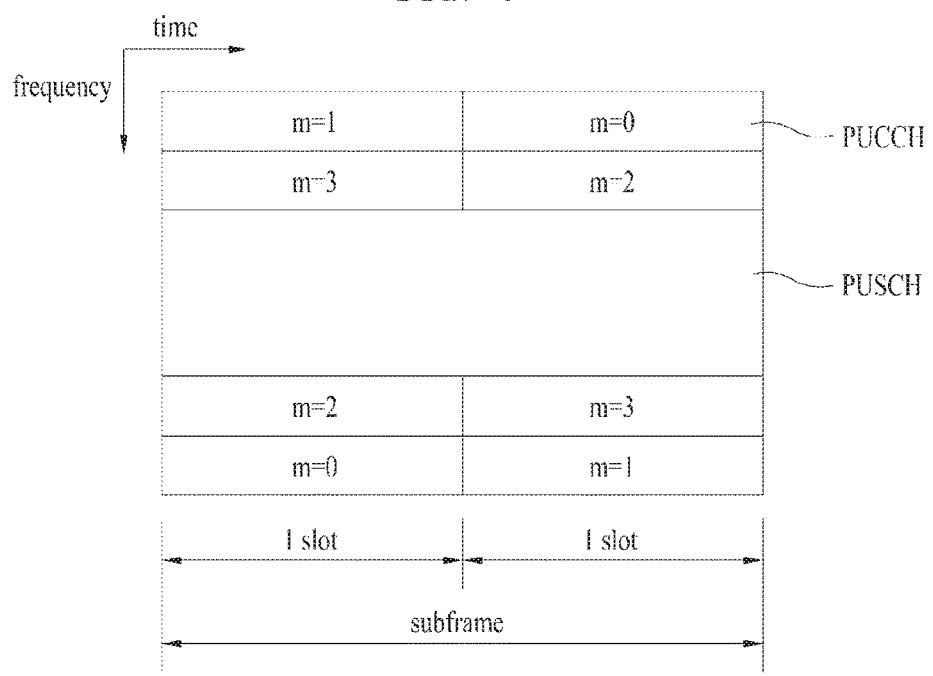
FIG. 4 illustrates the structure of an uplink subframe.

FIG. 4 illustrates an uplink subframe structure.

Referring to FIG. 4, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

Scheduling Request (SR): This is information used to request a UL-SCH resource and is transmitted using On-Off Keying (OOK) scheme.

HARQ ACK/NACK: This is a response to a downlink data packet (e.g. codeword) on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. A HARQ response includes positive ACK (simply, ACK), negative ACK (NACK), DTX (Discontinuous Transmission) or NACK/DTX. Here, HARQ-ACK is used with HARQ ACK/NACK and ACK/NACK interchangeably.

Channel State Information (CSI): This is feedback information about a downlink channel. MIMO (Multiple Input Multiple Output)-related feedback information includes a rank indicator (RI) and a precoding matrix indicator (PMI). 20 bits per subframe are used.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 3 shows the mapping relationship between PUCCH formats and UCI in LTE(-A).

TABLE 3

| PUCCH format | UCI (Uplink Control Information) |
| --- | --- |
| Format 1 | SR (Scheduling Request) (non-modulated waveform) |
| Format 1a | 1-bit HARQ ACK/NACK (SR exist/non-exist) |
| Format 1b | 2-bit HARQ ACK/NACK (SR exist/non-exist) |
| Format 2 | CQI (20 coded bits) |
| Format 2 | CQI and 1- or 2-bit HARQ ACK/NACK (20 bits) |
| Format 2a | (corresponding to only extended CP) |
| Format 2b | CQI and 1-bit HARQ ACK/NACK (20 + 1 coded bits) |
| Format 3 (LTE-A) | CQI and 2-bit HARQ ACK/NACK (20 + 2 coded bits) Up to 24-bit HARQ ACK/NACK + SR |

A description will be given of TDD signal transmission timing in a single carrier (or cell) situation with reference to FIGS. 5 to 11.

Figure 5:
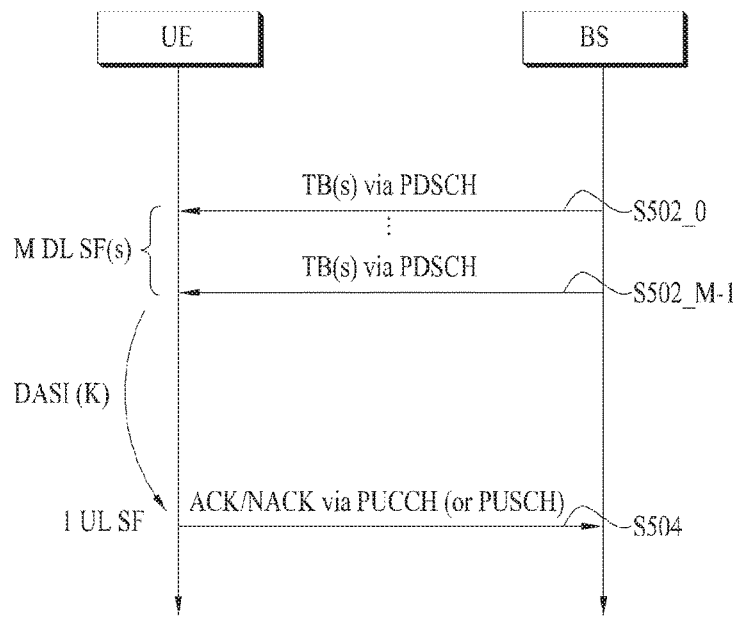
FIGS. 5 and 6 illustrate TDD UL ACK/NACK (Uplink Acknowledgement/Negative Acknowledgement) transmission timing in a single cell case.
Figure 6:
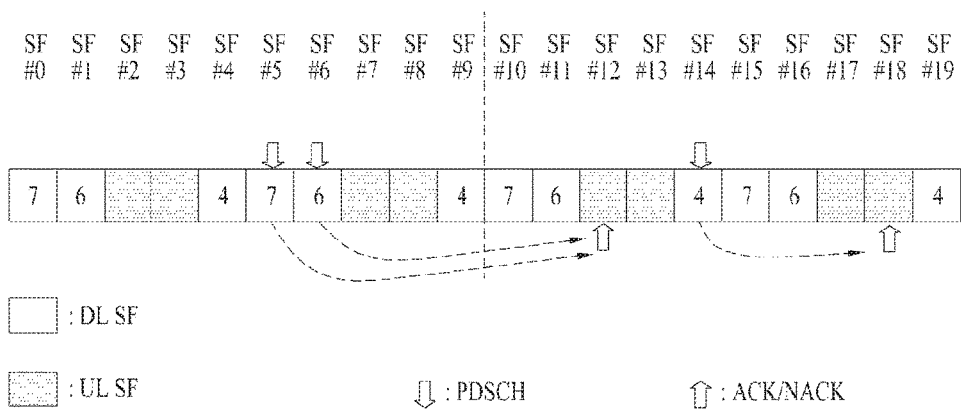

FIGS. 5 and 6 illustrate PDSCH-UL ACK/NACK timing. Here, UL ACK/NACK means ACK/NACK transmitted on uplink, as a response to DL data (e.g. PDSCH).

Referring to FIG. 5, a UE can receive one or more PDSCH signals in M DL subframes (SFs) (S502_0 to S502_M−1). Each PDSCH signal is used to transmit one or more (e.g. 2) transport blocks (TBs) according to transmission mode. A PDCCH signal indicating SPS (Semi-Persistent Scheduling) may also be received in step S502_0 to S502_M−1, which is not shown. When a PDSCH signal and/or an SPS release PDCCH signal is present in the M DL subframes, the UE transmits ACK/NACK through a UL subframe corresponding to the M DL subframes via processes for transmitting ACK/NACK (e.g. ACK/NACK (payload) generation, ACK/NACK resource allocation, etc.) (S504). ACK/NACK includes acknowledgement information about the PDSCH signal and/or an SPS release PDCCH received in step S502_0 to S502_M−1. While ACK/NACK is transmitted through a PUCCH basically, ACK/NACK is transmitted through a PUSCH when a PUSCH is transmitted at ACK/NACK transmission time. Various PUCCH formats shown in Table 3 can be used for ACK/NACK transmission. To reduce the number of ACK/NACK bits transmitted through a PUCCH format, various methods such as ACK/NACK bundling and ACK/NACK channel selection can be used.

As described above, in TDD, ACK/NACK relating to data received in the M DL subframes is transmitted through one UL subframe (i.e. M DL SF(s): 1 UL SF) and the relationship therebetween is determined by a DASI (Downlink Association Set Index).

Table 4 shows DASI (K: {k0, k1, . . . , k−1}) defined in LTE(-A). Table 4 shows spacing between a UL subframe transmitting ACK/NACK and a DL subframe relating to the UL subframe. Specifically, when a PDCCH that indicates PDSCH transmission and/or SPS release is present in a subframe n−k (k∈K), the UE transmits ACK/NACK in a subframe n.

TABLE 4

| TDD UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

FIG. 6 illustrates UL ACK/NACK transmission timing when UL-DL configuration #1 is configured. In the figure, SF#0 to #9 and SF#10 to #19 respectively correspond to radio frames, and numerals in blocks denote UL subframes relating to DL subframes. For example, ACK/NACK for a PDSCH of SF#5 is transmitted in SF#5+7 (=SF#12) and ACK/NACK for a PDSCH of SF#6 is transmitted in SF#6+6 (=SF#12). Accordingly, both ACKs/NACKs for DL signals of SF#5/#6 are transmitted in SF#12. Similarly, ACK/NACK for a PDSCH of SF#14 is transmitted in SF#14+4 (=SF#18).

Figure 7:
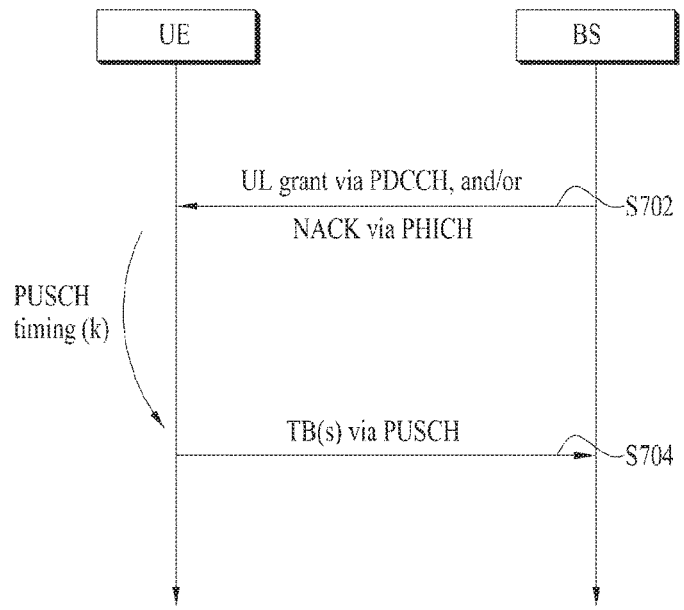
FIGS. 7 and 8 illustrate TDD PUSCH (Physical Uplink Shared Channel) transmission timing in a single cell case.
Figure 8:
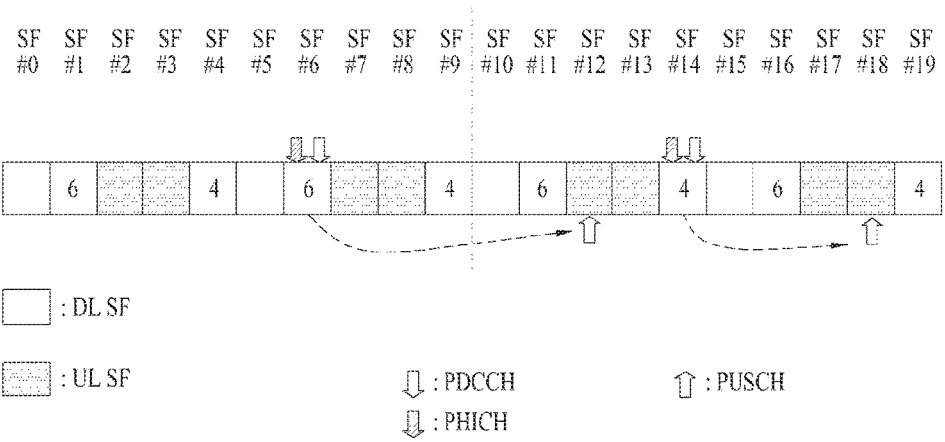

FIGS. 7 and 8 illustrate PHICH grant-PUSCH timing. A PUSCH can be transmitted corresponding to a PDCCH (UL grant) and/or a PHICH (NACK).

Referring to FIG. 7, the UE can receive a PDCCH (UL grant) and/or a PHICH (NACK) through a PDCCH (S702). Here, NACK corresponds to an ACK/NACK response to previous PUSCH transmission. In this case, the UE can initially transmit/retransmit one or more TBs through a PUSCH after k subframes via processes for PUSCH transmission (e.g. TB coding, TB-CW swiping, PUSCH resource allocation, etc.) (S704). The present embodiment is based on the assumption that a normal HARQ operation in which a PUSCH is transmitted once is performed. In this case, a PHICH and a UL grant corresponding to PUSCH transmission are present in the same subframe. However, in case of subframe bundling in which a PUSCH is transmitted multiple times through a plurality of subframes, a PHICH and a UL grant corresponding to PUSCH transmission may be present in different subframes.

Table 5 shows a UAI (Unlink Association Index) (k) for PUSCH transmission in LTE(-A). Table 5 shows spacing between a DL subframe from which a PHICH/UL grant is detected and a UL subframe relating to the DL subframe. Specifically, when a PHICH/UL grant is detected from a subframe n, the UE can transmit a PUSCH in a subframe n+k.

TABLE 5

| TDD UL-DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | 4 | 6 | | | | |
| 1 | | 6 | | 4 | | 6 | | | | 4 |
| 2 | | | | 4 | | | | | 4 | |
| 3 | 4 | | | | | | | 4 | 4 | |
| 4 | | | | | | | | 4 | 4 | |
| 5 | | | | | | | | | 4 | |
| 6 | 7 | 7 | | | | 7 | 7 | | | 5 |

FIG. 8 illustrates PUSCH transmission timing when UL-DL configuration #1 is configured. In the figure, SF#0 to #9 and SF#10 to #19 respectively correspond to radio frames, and numerals in blocks denote UL subframes relating to DL subframes. For example, a PUSCH corresponding to PHICH/UL grant of SF#6 is transmitted in SF#6+6 (=SF#12) and a PUSCH corresponding to a PHICH/UL grant of SF#14 is transmitted in SF#14+4 (=SF#18).

Figure 9:
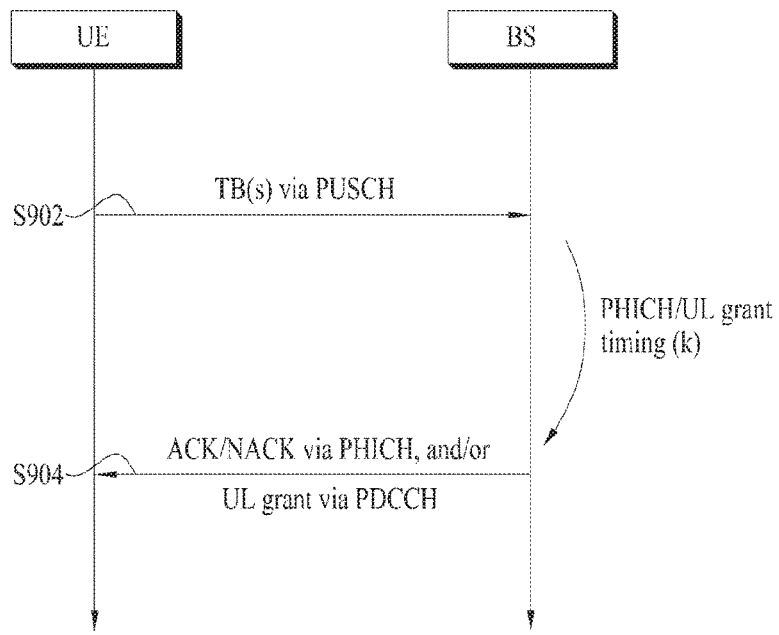
FIGS. 9 and 10 illustrate TDD DL ACK/NACK transmission timing in a single cell case.
Figure 10:
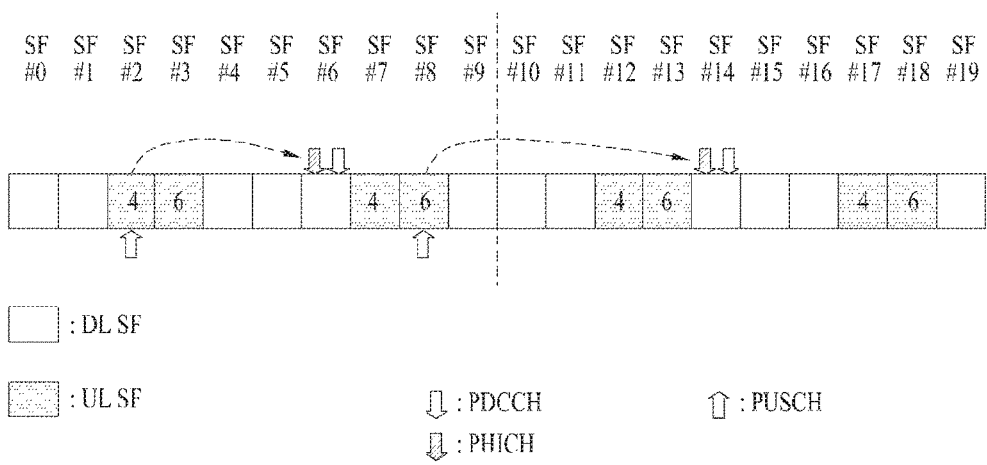

FIGS. 9 and 10 illustrate PUSCH-PHICH/UL grant timing. A PHICH is used to transmit DL ACK/NACK. Here, DL ACK/NACK means ACK/NACK transmitted on downlink as a response to UL data (e.g. PUSCH).

Referring to FIG. 9, the UE transmits a PUSCH signal to the BS (S902). Here, the PUSCH signal is used to transmit one or a plurality of (e.g. 2) TBs according to transmission mode. The BS can transmit ACK/NACK as a response to PUSCH transmission through a PHICH after k subframes via processes for ACK/NACK transmission (e.g. ACK/NACK generation, ACK/NACK resource allocation, etc.) (S904). ACK/NACK includes acknowledgement information about the PUSCH signal of step S902. When a response to PUSCH transmission is NACK, the BS can transmit a UL grant PDCCH for PUSCH retransmission to the UE after k subframe (S904). The present embodiment is based on the assumption that a normal HARQ operation in which a PUSCH is transmitted once is performed. In this case, a PHICH and UL grant used for PUSCH transmission can be transmitted in the same subframe. In case of subframe bundling, however, the PHICH and UL grant used for PUSCH transmission can be transmitted in different subframes.

Table 6 shows a UAI for PHICH/UL grant transmission in LTE(-A). Table 6 shows spacing between a DL subframe in which a PHICH/UL grant is present and a UL subframe relating to the DL subframe. Specifically, a PHICH/UL grant of a subframe i corresponds to PUSCH transmission through a subframe i-k.

TABLE 6

| TDD UL-DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | | 7 | 4 | | | | 7 | 4 | | |
| 1 | | | 4 | | | 6 | | 4 | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | | 6 | 4 | | | | 7 | 4 | | 6 |

FIG. 10 illustrates PHICH/UL grant transmission timing when UL-DL configuration #1 is configured. In the figure, SF#0 to #9 and SF#10 to #19 respectively correspond to radio frames, and numerals in blocks denote DL subframes relating to UL subframes. For example, a PHICH/UL grant corresponding to a PUSCH of SF#2 is transmitted in SF#2+4 (=SF#6) and a PHICH/UL grant corresponding to a PUSCH of SF#8 is transmitted in SF#8+6 (=SF#14).

PHICH resource allocation will now be described. When a PUSCH is transmitted in subframe #n, the UE determines a PHICH resource corresponding to the PUSCH in subframe #(n+$k_{PHICH}$). In case of FDD, $k_{PHICH}$ has a fixed value (e.g. 4). In case of TDD, $k_{PHICH}$ has a value depending on UL-DL configuration. Table 7 shows $k_{PHICH}$ for TDD is equivalent to Table 6.

TABLE 7

| TDD UL-DL Configuration | UL subframe index n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

A PHICH resource is provided by [PHICH group index, orthogonal sequence index]. The PHICH group index and the orthogonal sequence index are determined using (i) a lowest PRB index used for PUSCH transmission and (ii) a 3-bit field value for DMRS (Demodulation Reference Signal) cyclic shift. Here, (i) and (ii) are indicated by a UL grant PDCCH.

A description will be given of a HARQ process. The UE executes a plurality of parallel HARQ processes for UL transmission. The plurality of parallel HARQ processes is used to continuously perform UL transmission while the UE waits for HARQ feedback representing whether previous UL transmission has been successful or not. Each HARQ process relates to a HARQ buffer of a MAC (Medium Access Control) layer. Each HARQ process manages the number of transmissions of a MAC PDU (Physical Data Unit) in the buffer, HARQ feedback for the MAC PDU in the buffer, and a state parameter regarding a current redundancy version.

In case of LTE(-A) FDD, the number of UL HARQ processes for non-subframe bundling operation (i.e. normal HARQ operation) is 8. In case of LTE(-A) TDD, the number of UL HARQ processes and HARQ RTT (Round Trip Time) are configured differently according to DL-UL configurations because the number of UL subframes depends on UL-DL configuration. Here, the HARQ RTT may be a time interval (in the unit of SF or ms, for example) between a time when a UL grant is received and a time when a PHICH (corresponding to the UL grant) is received through transmission of a PUSCH (corresponding the UL grant) or a time interval between a PUSCH transmission time and a PUSCH retransmission time.

The number of UL HARQ processes varies. When subframe bundling is applied, a bundle of PUSCHs configured of 4 contiguous UL subframes is transmitted in FDD and TDD. Accordingly, a HARQ operation/process when subframe bundling is applied is different from the normal HARQ operation/process.

Table 8 shows the number of synchronous UL HARQ processes and HARQ RTT in TDD. When the UL HARQ RTT is 10 [SFs or ms] (UL-DL configurations #1, #2, #3, #4 and #5), one UL HARQ process uses one fixed UL SF timing. When the UL HARQ RTT does not correspond to 10 [SFs or ms] (UL-DL configurations #0 and #6), one UL HARQ process uses a plurality of UL SF timings (instead of one fixed UL SF timing) while hopping. For example, in case of UL-DL configuration #6, PUSCH transmission timings in one UL HARQ process are: SF #2: PUSCH=>SF #13: PUSCH (RTT: 11 SFs)=>SF #24: PUSCH (RTT: 11 SFs)=>SF #37: PUSCH (RTT: 13 SFs)=>SF #48: PUSCH (RTT: 11 SFs)=>SF #52: PUSCH (RTT: 14 SFs).

TABLE 8

| UL-DL configuration | Number of UL SFs | Number of HARQ processes for normal HARQ operation | HARQ RTT |
|---|---|---|---|
| 0 | 6 | 7 | 11 or 13 |
| 1 | 4 | 4 | 10 |
| 2 | 2 | 2 | 10 |
| 3 | 3 | 3 | 10 |
| 4 | 2 | 2 | 10 |
| 5 | 1 | 1 | 10 |
| 6 | 5 | 6 | 11 or 13 or 14 |

In case of TDD UL-DL configurations #1 to #6 and normal HARQ operation, the UE transmits a corresponding PUSCH signal in subframe n+k (refer to Table 5) according to UL grant PDCCH and/or PHICH information upon detection of the UL grant PDCCH and/or PHICH information in subframe n.

In case of TDD UL-DL configuration #0 and the normal HARQ operation, when a UL DCI grant PDCCH and/or a PHICH are detected from subframe n, PUSCH transmission timing of the UE is varied according to conditions. When the MSB (Most Significant bit) of a UL index in DCI is 1 or the PHICH is received through a resource corresponding to $I_{PHICH}=0$ in subframe #0 or #5, the UE transmits the corresponding PUSCH signal in subframe n+k (refer to Table 5). When the LSB (Least Significant bit) of the UL index in the DCI is 1, the PHICH is received through a resource corresponding to $I_{PHICH}=1$ in subframe #0 or #5, or the PHICH is received in subframe #1 or #6, UE transmits the corresponding PUSCH signal in subframe n+7. When both the MSB and LSB in the DCI are set, the UE transmits the corresponding PUSCH signal in subframe n+k (refer to Table 5) and subframe n+7.

Figure 11:
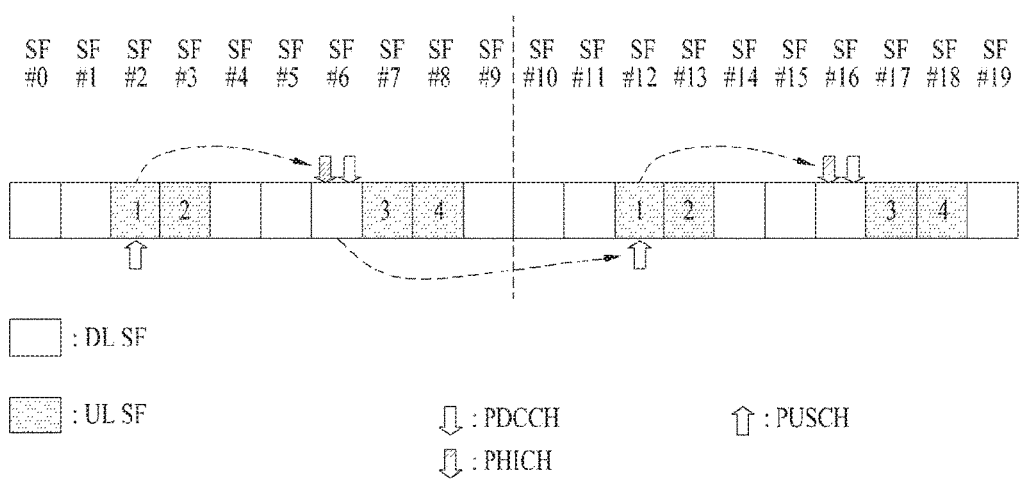
FIG. 11 illustrates a TDD HARQ (Hybrid Automatic Repeat request) process in a single cell situation.

FIG. 11 illustrates a synchronous UL HARQ process when UL-DL configuration #1 is configured. Numerals in blocks denote UL HARQ process numbers. The synchronous UL HARQ process shown in FIG. 11 corresponds to a normal HARQ process. Referring to FIG. 11, HARQ process #1 involves SF#2, SF#6, SF#12 and SF#16. For example, if an initial PUSCH signal (e.g. RV=0) is transmitted in SF#2, a UL grant PDCCH and/or a PHICH corresponding to the PUSCH signal can be received in SF#6 and a (retransmission) PUSCH signal (e.g. RV=2) corresponding to the initial PUSCH signal can be transmitted in SF#12. Accordingly, 4 UL HARQ processes having an RTT (Round Trip Time) of 10 SFs (or 10 ms) are present in case of UL-DL configuration #1.

Figure 12:
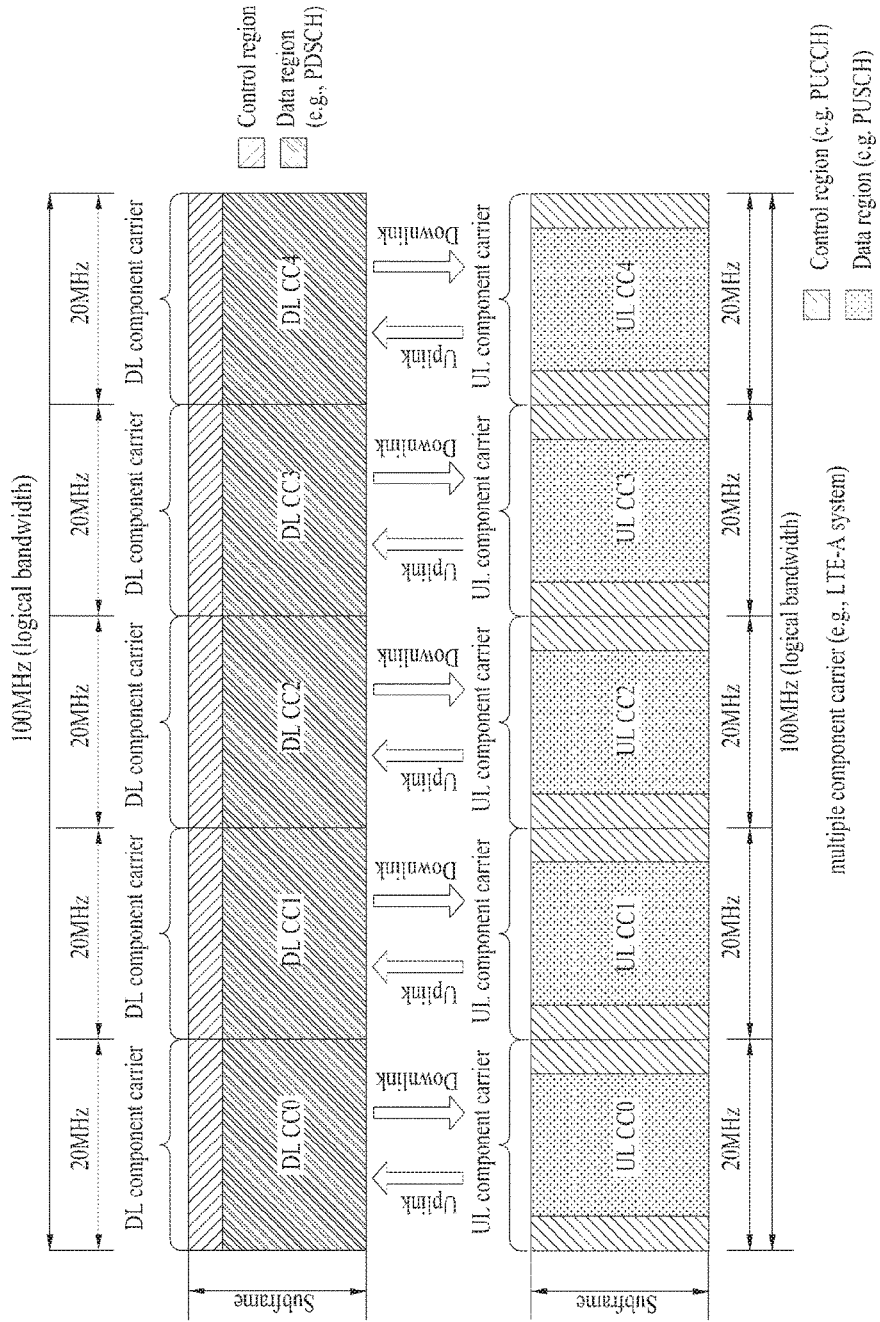
FIG. 12 illustrates a carrier aggregation (CA)-based wireless communication system.

FIG. 12 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 12, a plurality of UL/DL CCs can be aggregated to support a wider UL/DL bandwidth. The CCs may be contiguous or non-contiguous in the frequency domain. Bandwidths of the CCs can be independently determined. Asymmetrical CA in which the number of UL CCs is different from the number of DL CCs can be implemented.

For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be configured cell-specifically, UE-group-specifically, or UE-specifically. Control information may be transmitted/received only through a specific CC. This specific CC can be referred to as a Primary CC (PCC) (or anchor CC) and other CCs can be referred to as Secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell operating on a DL CC SIB2-linked to a UL CC. Furthermore, the PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_Connected state, for which CA is not configured or which does not support CA. On the other hand, one or more serving cells exist, including a PCell and entire SCells, for a UE in an RRC_CONNECTED state, for which CA is configured. For CA, a network may configure one or more SCells in addition to an initially configured PCell, for a UE supporting CA during connection setup after an initial security activation operation is initiated.

Figure 13:
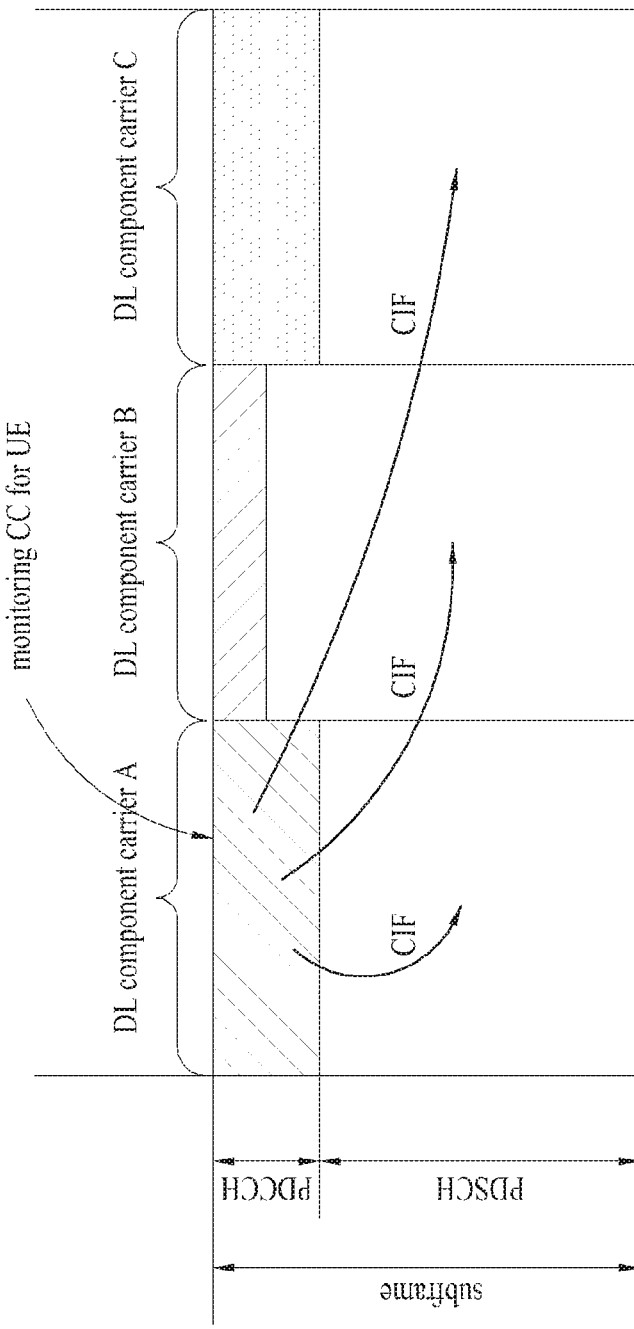
FIG. 13 illustrates a scheduling method when a plurality of cells is configured.

FIG. 13 illustrates scheduling when a plurality of carriers is aggregated. It is assumed that 3 DL CCs are aggregated and DL CC A is configured as a PDCCH CC. DL CC A, DL CC B and DL CC C can be called serving CCs, serving carriers, serving cells, etc. In case of CIF (Carrier Indicator Field) disabled, a DL CC can transmit only a PDCCH that schedules a PDSCH corresponding to the DL CC without a CIF (non-cross-CC scheduling). When the CIF is enabled according to UE-specific (or UE-group-specific or cell-specific) higher layer signaling, a specific CC (e.g. DL CC A) can transmit not only a PDCCH that schedules the PDSCH corresponding to the DL CC A but also PDCCHs that schedule PDSCHs of other DL CCs using the CIF (cross-CC scheduling). A PDCCH is not transmitted in DL CC B/C.

A specific CC (or cell) used for PDCCH transmission is called a scheduling CC (or scheduling cell). The scheduling CC (or cell) may be used with a monitoring CC (or MCC) interchangeably. A CC (or cell) in which a PDSCH/PUSCH is scheduled by a PDCCH of another CC is called a scheduled CC (or scheduled cell). One or more scheduling CCs may be configured for one UE and one of the scheduling CCs may be used for DL control signaling and UL PUCCH transmission. That is, a scheduling CC includes a PCC. When only one scheduling CC is configured, the scheduling CC corresponds to the PCC. The scheduling CC/scheduled CC may also be called MCC/SCC in the following description.

When cross-CC scheduling is configured, CCs carrying signals are defined according to signal type as follows.
 PDCCH (UL/DL grant): scheduling CC (or MCC)
 PDSCH/PUSCH: CC indicated by a CIF of a PDCCH, detected from a scheduling CC
 DL ACK/NACK (e.g. PHICH): scheduling CC (or MCC) (e.g. DL PCC)
 UL ACK/NACK (e.g. PUCCH): UL PCC Embodiment: Signal Transmission and Reception Using Reversed-cfg In a legacy LTE (-A) system, a UL/DL SF ratio of a TDD radio frame is differently configured according to a UD-cfg (refer to Table 1). Hence, in case of DL heavy UD-cfg, it may be able to configure a plurality of HARQ-ACK responses (A/N) corresponding to DL data received via a plurality of DL SFs to be transmitted via a single UL SF (Case 1). And, in case of UL heavy UD-cfg, it may be able to configure a UL grant DCI for scheduling UL data transmitted via a plurality of UL SFs or a corresponding PHICH response to be transmitted via a single DL SF (Case 2). As a result, in case of the Case 1, DL data-to-A/N delay increases and (CW and/or SF) A/N bundling is inevitably applied due to PUCCH payload restriction. In case of the Case 2, PUSCH-to-PUSCH round trip delay increases and the degree of freedom of UL scheduling can be lowered since a plurality of UL SFs are scheduled at the same by a single UL grant DCI.

In the following, a reversed SF configuration-based CA scheme is proposed to reduce HARQ timing delay and enhance data throughout and scheduling flexibility in a TDD-based system. According to the proposed scheme, 1) a new UD-cfg of which SF direction is reversed (hereinafter, reversed-cfg) is generated for a legacy UD-cfg (hereinafter, original-cfg), 2) when a cell A (original-cfg) and a cell B (reversed-cfg) are combined with each other for a UE, 3) it may be able to apply FDD DL/UL HARQ timeline to both DL scheduling and UL scheduling for the cell A and the cell B. In this case, the FDD DL HARQ timeline indicates that DL data-to-A/N timing/delay corresponds to k ms (or SFs). The FDD UL HARQ timeline indicates that UL grant-to-PUSCH or PUSCH-to-PHICH timing/delay corresponds to k ms or SFs and PUSCH-to-PUSCH timing/delay corresponds to 2k or SFs. In this case, the k corresponds to an integer of a fixed amount. For example, the k may correspond to 4. The ms or SF can be commonly referred to as a TTI (transmission time interval).

In the following description, assume that a signal is mainly transmitted and received by a UE. Although a signal is mainly transmitted and received by a base station (or a relay), direction of the signal is changed only and the same content can be applied.

First of all, in case of generating reversed-cfg of which an SF direction is reversed according to original-cfg, the reversed-cfg can be summarized as shown in Table 9. The original-cfg corresponds to Table 1 and can be configured according to a cell via an SIB (system information block). A reversed-cfg #0 can be configured in an SF form that an original-cfg #1 is shifted (to the right side as many as 3 SFs). A reversed-cfg #1 can be configured in an SF form that an original-cfg #0 is shifted (to the right side as many as 2 SFs).

TABLE 9

|  | SF number | | | | | | | | | |
| --- | --- | --- | --- | --- | --- | --- | --- | --- | --- | --- |
|  | 0 | 1 | 2 | 3 | 4 | 5 | 6 | 7 | 8 | 9 |
| Original-cfg #0 | D | S | U | U | U | D | S | U | U | U |
| Reversed-cfg #0 | U | U | D | D | S | U | U | D | D | S |
| Original-cfg #1 | D | S | U | U | D | D | S | U | U | D |
| Reversed-cfg #1 | U | U | D | S | U | U | D | D | S | U |
| Original-cfg #2 | D | S | U | D | D | D | S | U | D | D |
| Reversed-cfg #2 | U | U | S | U | U | U | S | U | U | U |
| Original-cfg #3 | D | S | U | U | U | D | D | D | D | D |
| Reversed-cfg #3 | U | U | D | D | S | U | U | U | U | U |
| Original-cfg #4 | D | S | U | U | D | D | D | D | D | D |
| Reversed-cfg #4 | U | U | D | S | U | U | U | U | U | U |
| Original-cfg #5 | D | S | U | D | D | D | D | D | D | D |
| Reversed-cfg #5 | U | U | S | U | U | U | U | U | U | U |
| Original-cfg #6 | D | S | U | U | U | D | S | U | U | D |
| Reversed-cfg #6 | U | U | D | D | S | U | U | D | S | U |

In this case, D, U and S correspond to a DL SF, a UL SF, and an S SF, respectively. S can be used for D or U. In the view of generating reversed-cfg, assume that the S is used for D.

Two cells configured by an original/reversed-cfg (hereinafter, a paired UD-cfg) including an identical cfg number can be configured/set to a single UE. As an example, a cell A configured by an original-cfg #1 and a cell B configured by a reversed-cfg #1 can be set to a single UE. In this situation, a method of configuring a HARQ timeline, which is proposed in relation to DL/UL scheduling of the cell A/B, is explained in the following.

In case of DL HARQ, A/N corresponding to D or S of an SF #n can be transmitted via U of an SF #(n+4) by applying FDD HARQ timing. In this case, the A/N corresponding to the D or S of the SF #n corresponds to an A/N signal for scheduling/receiving DL data in the SF #n. The A/N signal is configured only in response to DL data received in a single SF. The A/N signal can be configured by an individual reception response according to TB/CW without applying A/N bundling.

A/N corresponding to D (cell A) of SF #0 is transmitted via U (cell B) of SF #4.
A/N corresponding to S (cell A) of SF #1 is transmitted via U (cell B) of SF #5.
A/N corresponding to D (cell B) of SF #2 is transmitted via U (cell B) of SF #6.
A/N corresponding to S (cell B) of SF #3 is transmitted via U (cell A) of SF #7.

In case of UL HARQ, UL data corresponding to D or S of an SF #n can be transmitted via U of an SF #(n+4) by applying FDD HARQ timing and PHICH (and/or retransmission UG) corresponding to UL data transmission can be received as follows via D or S. UL data corresponding to D or S of the SF #n corresponds to UL data corresponding to UG and/or PHICH transmission in the SF #n.

UL data corresponding to UG/PHICH transmitted in D (cell A) of SF #0 is transmitted via U (cell B) of SF #4 and PHICH/UG corresponding to UL data transmitted in U (cell B) of SF #4 is received via S (cell B) of SF #8.
UL data corresponding to UG/PHICH transmitted in S (cell A) of SF #1 is transmitted via U (cell B) of SF #5 and PHICH/UG corresponding to UL data transmitted in U (cell B) of SF #5 is received via D (cell A) of SF #9.

Meanwhile, a synchronization signal (e.g., PSS/SSS) for performing DL synchronization in reversed-cfg can be transmitted via a specific symbol belonging to the forepart of SF #2 capable of being a common DL resource to all reversed-cfgs. In this case, for example, the forepart of the SF #2 may correspond to a first slot, a minimum DL region capable of being possessed by S, or a legacy control channel region. The legacy control channel region may correspond to a region corresponding to CFI=3 (i.e., 3 or 4 OFDM symbols depending on a BW). On the contrary, a synchronization signal for performing synchronization in original-cfg (e.g., PSS/SSS) can be transmitted in a manner of being identical to a legacy method. In particular, P-SCH (PSS) is transmitted via $3^{rd}$ OFDM symbol of SF #1/#6 and S-SCH (SSS) is located at the last OFDM symbol of a slot #1 (i.e., a second slot of SF #0) and a slot #11 (i.e., a second slot of SF #5).

Meanwhile, in reversed-cfg, PHICH can be transmitted via all Ds or Ss. Hence, UL data retransmission can be performed in all Ds or Ss with reference to the PHICH. On the contrary, in original-cfg, there exists D or S configured not to transmit PHICH. In the D or S, retransmission can be performed based on a UL grant only without the PHICH (PHICH-less operation). To this end, a PHY layer of a UE automatically signals ACK to a higher layer of the UE in the D or S configured not to transmit PHICH to make automatic retransmission not to be performed for UL data.

Table 10 shows an example of a legacy PHICH resource set to original-cfg.

TABLE 10

| Uplink-downlink configuration | Subframe number i | | | | | | | | | |
| --- | --- | --- | --- | --- | --- | --- | --- | --- | --- | --- |
|  | 0 | 1 | 2 | 3 | 4 | 5 | 6 | 7 | 8 | 9 |
| 0 | 2 | 1 | — | — | — | 2 | 1 | — | — | — |
| 1 | 0 | 1 | — | — | 1 | 0 | 1 | — | — | 1 |
| 2 | 0 | 0 | — | 1 | 0 | 0 | 0 | — | 1 | 0 |
| 3 | 1 | 0 | — | — | — | 0 | 0 | 0 | 1 | 1 |
| 4 | 0 | 0 | — | — | 0 | 0 | 0 | 0 | 1 | 1 |
| 5 | 0 | 0 | — | 0 | 0 | 0 | 0 | 0 | 1 | 0 |
| 6 | 1 | 1 | — | — | — | 1 | 1 | — | — | 1 |

The number of PHICH groups assigned to each SF is given by $m_i * N_{PHICH}^{group}$ and each number in Table 10 indicates $m_i$. $N_{PHICH}^{group}$ is determined in advance based on a DL BW. "-" corresponds to a UL SF. Hence, SFs represented by "-" and "0" do not have a PHICH resource.

Hence, if a cell A configured by original-cfg and a cell B configured by reversed-cfg are set to a UE, the UE may operate as follows.

When UL data us transmitted in SF #n (cell A), UL data retransmission can be performed with reference to PHICH of SF #n+4 (cell B). In particular, a PHY layer of a UE can signal ACK or NACK to a higher layer (e.g., MAC layer) of the UE with reference to PHICH of SF #n+4 (cell B) in response to HARQ-ACK. If ACK is signaled, the UE maintains UL data buffered in HARQ buffer. If NACK is signaled, the UE retransmits UL data in SF #n+8 (cell A).

When UL data us transmitted in SF #n (cell B), a UE can retransmit the UL data in a manner of selectively referring to PHICH according to whether or not a PHICH resource exists in SF #n+4 (cell A). For example, if a cell A is configured by original-cfg #1 and SF #n+4 corresponds to SF #1, the UE can perform UL data retransmission with reference to PHICH. On the contrary, if the cell A is configured by original-cfg #1 and SF #n+4 corresponds to SF #2, the UE can perform retransmission based on a UL grant only without referring to PHICH. In particular, a PHY layer of the UE signals ACK to a higher layer of the UE in response to HARQ-ACK without referring to PHICH to make UL data not to be automatically retransmitted.

The aforementioned operation mainly describes UL data retransmission based on PHICH. If a UL grant requiring UL data retransmission is received in SF #n+4, UL data retransmission is performed based on the UL grant without referring to PHICH.

Meanwhile, in case of a cell ID of a cell configured by reversed-cfg, 1) the cell ID can be configured by a cell ID of a paired cell configured by original-cfg, or 2) the cell ID can be configured by a separate independent cell ID (irrespective of the paired cell configured by original-cfg). And, 1) a cell configured by reversed-cfg and a cell configured by original-cfg can be configured/set in a CA form, or 2) two cells configured by original/reversed-cfg can be set to a UE as an extended cell (in terms of CA).

Figure 14:
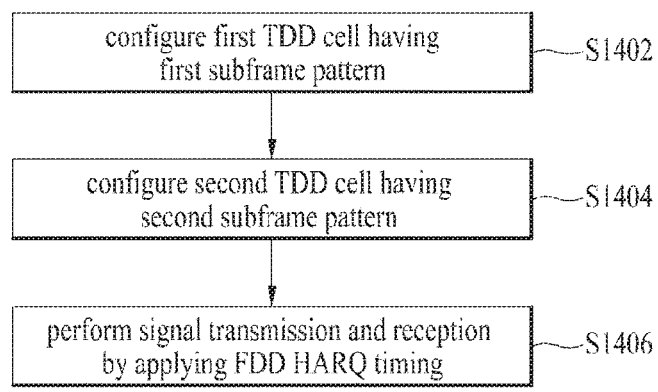
FIG. 14 illustrates an example for a method of transmitting control information according to the present invention.

FIG. 14 illustrates an example for a method of transmitting control information according to the present invention.

Referring to FIG. 14, a UE configures a first TDD cell including a first SF pattern [S1402] and may be able to configure a second TDD cell including a second SF pattern [S1406]. In this case, UL/DL SF pattern of the first SF pattern and UL/DL SF pattern of the second SF pattern can be symmetrically configured. In the symmetrical viewpoint, a DL SF can includes an S SF. For example, the first SF pattern and the second SF pattern can be configured according to original-cfg#i/reverser-cfg#i shown in Table 9. In this case, DL/UL HARQ timeline/timing used for performing a DL/UL HARQ process may follow FDD DL/UL HARQ timeline/timing [S1406]. If the UL/DL SF pattern of the first SF pattern and the UL/DL SF pattern of the second SF pattern are symmetrical to each other, PSS/SSS signal transmission, PHICH resource configuration, UL data retransmission and the like can be performed according to the method proposed in the foregoing description. Meanwhile, if the second TDD cell is not configured or if the UL/DL SF pattern of the first SF pattern and the UL/DL SF pattern of the second SF pattern are not symmetrical to each other, the DL/UL HARQ timeline/timing used for performing the DL/UL HARQ process may follow TDD DL/UL HARQ timeline/timing (refer to FIGS. 5 to 11).

Figure 15:
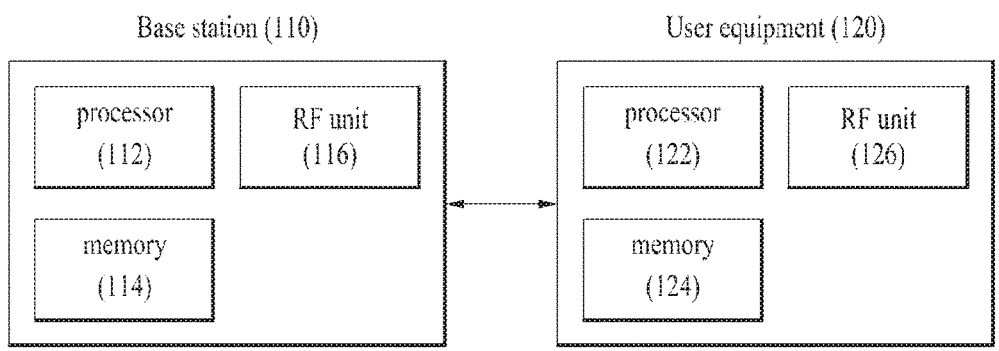
FIG. 15 illustrates a base station and a user equipment applicable to an embodiment of the present invention.

FIG. 15 illustrates a BS and a UE of a wireless communication system, which are applicable to embodiments of the present invention. When the wireless communication system includes a relay, the BS or UE can be replaced by the relay.

Referring to FIG. 15, the wireless communication system includes a BS 110 and a UE 120. The BS 110 includes a processor 112, a memory 114 and a radio frequency (RF) unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 122 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or the UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication apparatus such as a UE, a relay or a BS.

What is claimed is:

1. A method of transmitting control information, which is transmitted by a user equipment in a wireless communication system, comprising the steps of:
    configuring a first TDD (time division duplex) cell containing a first subframe pattern;
    configuring a second TDD cell containing a second subframe pattern, wherein a transmission direction according to the first subframe pattern and a transmission direction according to the second subframe pattern are different from each other in every subframe;

receiving PDSCH (physical downlink shared channel) in a DL subframe #n of the first TDD cell; and transmitting HARQ-ACK (hybrid automatic repeat request acknowledgement) information on the PDSCH in a UL subframe #n+k of the second TDD cell, wherein the n corresponds to an integer equal to or greater than 0 and wherein the k corresponds to a positive integer which is fixed irrespective of the first subframe pattern and the second subframe pattern.

2. The method of claim 1, wherein at least a part of the transmission direction according to the first subframe pattern and at least a part of the transmission direction according to the second subframe pattern are opposite to each other in every subframe.

3. The method of claim 1, wherein a DL (downlink)/UL (uplink) SF (subframe) pattern according to the first subframe pattern and a DL/UL SF pattern according to the second subframe patter are symmetrical to each other and wherein a DL SF comprises an S (special) SF.

4. The method of claim 1, wherein the first subframe pattern is defined by original-cfg #i, wherein the second subframe pattern is defined by reverse-cfg #i, and wherein the i corresponds to an integer selected from among 0 to 6;

|  | SF number | | | | | | | | | |
|---|---|---|---|---|---|---|---|---|---|---|
|  | 0 | 1 | 2 | 3 | 4 | 5 | 6 | 7 | 8 | 9 |
| Original-cfg #0 | D | S | U | U | U | D | S | U | U | U |
| Reversed-cfg #0 | U | U | D | D | S | U | U | D | D | S |
| Original-cfg #1 | D | S | U | U | D | D | S | U | U | D |
| Reversed-cfg #1 | U | U | D | S | U | U | U | D | S | U |
| Original-cfg #2 | D | S | U | D | D | D | S | U | D | D |
| Reversed-cfg #2 | U | U | S | U | U | U | U | S | U | U |
| Original-cfg #3 | D | S | U | U | U | D | D | D | D | D |
| Reversed-cfg #3 | U | U | D | D | S | U | U | U | U | U |
| Original-cfg #4 | D | S | U | U | D | D | D | D | D | D |
| Reversed-cfg #4 | U | U | D | S | U | U | U | U | U | U |
| Original-cfg #5 | D | S | U | D | D | D | D | D | D | D |
| Reversed-cfg #5 | U | U | S | U | U | U | U | U | U | U |
| Original-cfg #6 | D | S | U | U | U | D | S | U | U | D |
| Reversed-cfg #6 | U | U | D | D | S | U | U | D | S | U |

In this case, D, U and S correspond to a DL SF, a UL SF and an S SF, respectively.

5. The method of claim 1, wherein the k is fixed irrespective of the first subframe pattern and the second subframe pattern.

6. A user equipment configured to transmit control information in a wireless communication system, comprising:

an RF (radiofrequency) unit; and a processor, the processor configured to set a first TDD (time division duplex) cell containing a first subframe pattern, the processor configured to set a second TDD cell containing a second subframe pattern, wherein a transmission direction according to the first subframe pattern and a transmission direction according to the second subframe pattern are different from each other in every subframe, the processor configured to receive PDSCH (physical downlink shared channel) in a DL subframe #n of the first TDD cell, the processor configured to transmit HARQ-ACK (hybrid automatic repeat request acknowledgement) information on the PDSCH in a UL subframe #n+k of the second TDD cell, wherein the n corresponds to an integer equal to or greater than 0 and wherein the k corresponds to a positive integer which is fixed irrespective of the first subframe pattern and the second subframe pattern.

7. The user equipment of claim 6, wherein at least a part of the transmission direction according to the first subframe pattern and at least a part of the transmission direction according to the second subframe pattern are opposite to each other in every subframe.

8. The user equipment of claim 6, wherein a DL (downlink)/UL (uplink) SF (subframe) pattern according to the first subframe pattern and a DL/UL SF pattern according to the second subframe patter are symmetrical to each other and wherein a DL SF comprises an S (special) SF.

9. The user equipment of claim 6, wherein the first subframe pattern is defined by original-cfg #i, wherein the second subframe pattern is defined by reverse-cfg #i, and wherein the i corresponds to an integer selected from among 0 to 6;

|  | SF number | | | | | | | | | |
|---|---|---|---|---|---|---|---|---|---|---|
|  | 0 | 1 | 2 | 3 | 4 | 5 | 6 | 7 | 8 | 9 |
| Original-cfg #0 | D | S | U | U | U | D | S | U | U | U |
| Reversed-cfg #0 | U | U | D | D | S | U | U | D | D | S |
| Original-cfg #1 | D | S | U | U | D | D | S | U | U | D |
| Reversed-cfg #1 | U | U | D | S | U | U | U | D | S | U |
| Original-cfg #2 | D | S | U | D | D | D | S | U | D | D |
| Reversed-cfg #2 | U | U | S | U | U | U | U | S | U | U |
| Original-cfg #3 | D | S | U | U | U | D | D | D | D | D |
| Reversed-cfg #3 | U | U | D | D | S | U | U | U | U | U |
| Original-cfg #4 | D | S | U | U | D | D | D | D | D | D |
| Reversed-cfg #4 | U | U | D | S | U | U | U | U | U | U |
| Original-cfg #5 | D | S | U | D | D | D | D | D | D | D |
| Reversed-cfg #5 | U | U | S | U | U | U | U | U | U | U |
| Original-cfg #6 | D | S | U | U | U | D | S | U | U | D |
| Reversed-cfg #6 | U | U | D | D | S | U | U | D | S | U |

In this case, D, U and S correspond to a DL SF, a UL SF and an S SF, respectively.

10. The user equipment of claim 6, wherein the k is fixed irrespective of the first subframe pattern and the second subframe pattern.

* * * * *